United States Patent [19]

Zehrung, Jr. et al.

[11] Patent Number: 5,119,880
[45] Date of Patent: Jun. 9, 1992

[54] AERATING APPARATUS

[75] Inventors: Claude D. Zehrung, Jr., Denver; William H. Oliver, Highlands Ranch, both of Colo.

[73] Assignee: BlueBird International, Inc., Englewood, Colo.

[21] Appl. No.: 643,437

[22] Filed: Jan. 22, 1991

[51] Int. Cl.⁵ .............................................. A01B 45/02
[52] U.S. Cl. ........................................ 172/22; 172/43; 172/364; 56/17.2
[58] Field of Search ...................... 172/22, 21, 14, 42, 172/43, 364, 359, 395; 56/DIG. 18, 16.7, 17.1, 17.2

[56] References Cited

U.S. PATENT DOCUMENTS

| | | | |
|---|---|---|---|
| 1,426,383 | 8/1922 | Hodge | 172/364 |
| 2,400,204 | 5/1946 | Lindskog | 172/21 |
| 2,638,831 | 5/1953 | Ferguson et al. | 172/43 |
| 2,918,130 | 12/1959 | Thou | 172/22 |
| 3,217,474 | 11/1965 | Neilson | 56/17.2 |
| 3,792,734 | 2/1974 | Ellis et al. | 172/364 |
| 3,802,513 | 4/1974 | Ploenges | 172/21 |
| 4,336,760 | 6/1982 | Cohen et al. | 172/21 |
| 4,550,783 | 11/1985 | Hansen . | |
| 4,645,011 | 2/1987 | Feikema et al. | 56/17.1 |
| 4,756,101 | 7/1988 | Friberg et al. | 56/17.2 |
| 4,773,486 | 9/1988 | Huber et al. | 172/22 |
| 4,835,952 | 6/1989 | Mclane | 56/17.2 |
| 4,867,244 | 9/1989 | Cozine et al. | 172/22 |

FOREIGN PATENT DOCUMENTS 2046083 10/1971 Fed. Rep. of Germany .
8912381 12/1989 PCT Int'l Appl. ............ 172/21
1089843 11/1967 United Kingdom ........... 172/21

OTHER PUBLICATIONS

Ryan Brochure, front cover only, Lawnaire IV, Model 544863, Operator's and Parts Manual.

Primary Examiner—Randolph A. Reese
Assistant Examiner—Spencer Warnick
Attorney, Agent, or Firm—Klaas, Law, O'Meara & Malkin

[57] ABSTRACT

Aerating apparatus is provided and includes a chassis having a handle, a rotor having aerating tines rotatably mounted on the chassis, drive means for rotating the rotor, a support member rotatably mounted on the chassis for movement between a down location at which the aerating tines are out of contact with the ground and an up location at which the aerating tines are in contact with the ground, a pair of wheels mounted on the support member, first and second linkage apparatuses pivotally mounted on the chassis and moving apparatus mounted on the handle for moving the first and second linkage apparatuses to move the support member to the down or up location, adjusting apparatus for adjusting the position of the pair of wheels when the support member is at the up location and a connecting rod connecting the first and second linkage apparatuses for assuring simultaneous movement thereof. The handle and the moving apparatus are pivotally mounted on the chassis for movement between a generally upright operating position and a generally horizontal transporting position.

21 Claims, 2 Drawing Sheets

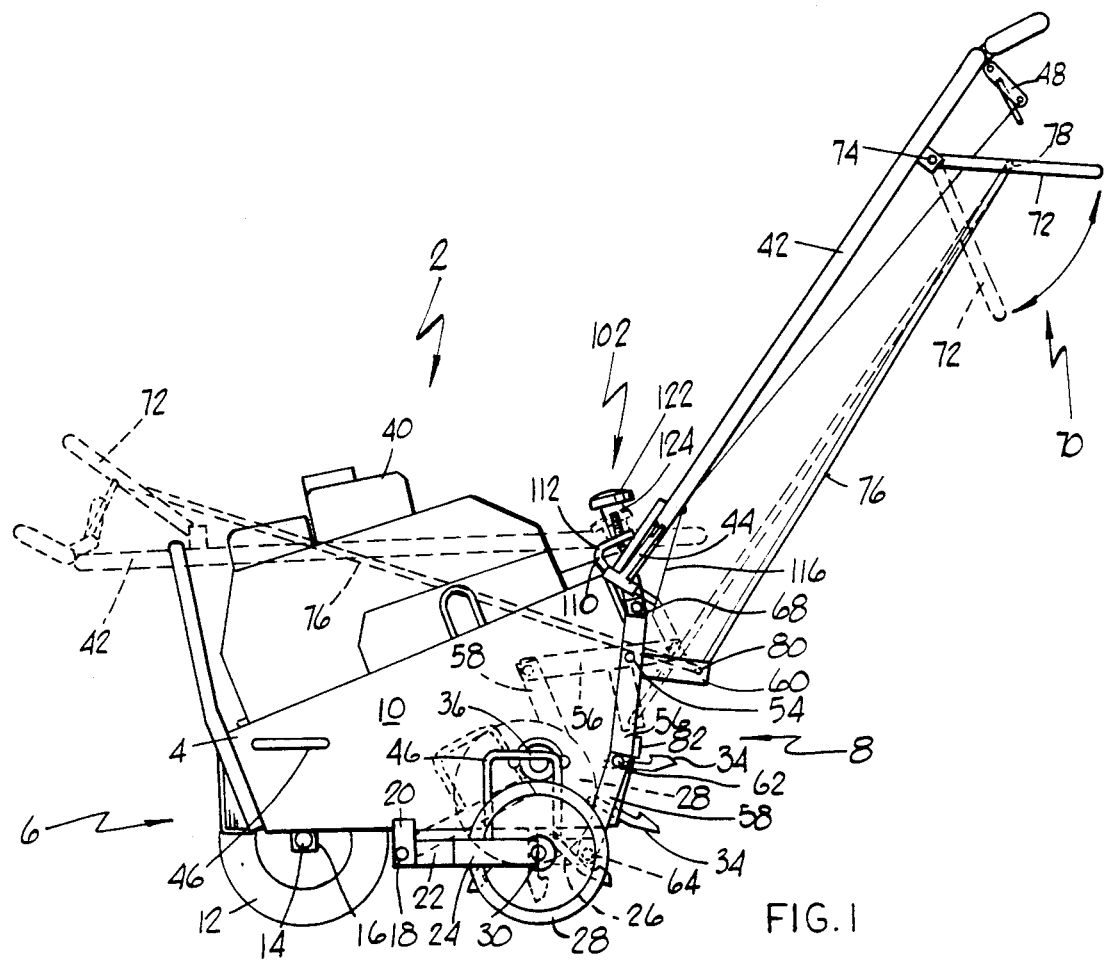
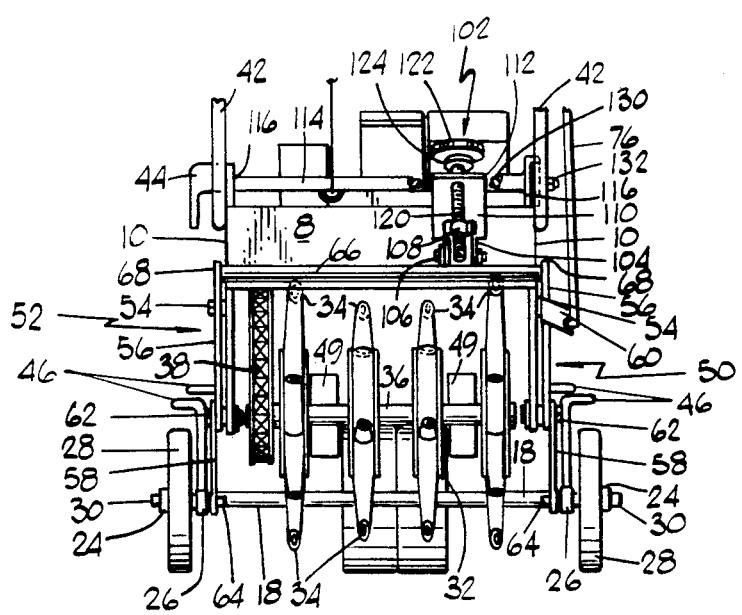

AERATING APPARATUS

BACKGROUND OF THE INVENTION

This invention relates generally to aerating apparatus for aerating the ground and more particularly to apparatus for moving the rotor of the aerating apparatus between operative and inoperative locations.

Aerating apparatuses for aerating the ground are well known. In general, an aerating apparatus has a chassis having a rotor with aerating tines rotatably mounted on the chassis and drive means for rotating the rotor. Support means are generally provided for supporting the rotor at a down location at which the aerating tines are not in contact with the ground and an up location at which the aerating tines are in contact with the ground. The support means have back wheels which supposedly control the penetration of the aerating tines into the ground. However, when aerating large areas, the ground in many places is too hard to permit full penetration of the aerating tines so that the back wheels are out of contact with the ground and therefore the aerating apparatus loses lateral stability. This is particularly significant when making turns. Some aerating apparatuses have control means mounted on the handle for moving the support means between the down and up locations. In one such control means, linkage means are pivotally mounted on each side of the chassis and a lever is rotatably mounted on the handle. A pair of rods are mounted at one end thereof for movement with the handle and at the other end thereof to one of the linkage means.

BRIEF DESCRIPTION OF THE INVENTION

This invention provides an aerating apparatus having adjusting means for adjusting the position of the back wheels when the back wheels are at the up location to provide for lateral stability of the aerating apparatus and to control the depth of penetration of the tines into the ground. Connecting means are provided for connecting the spaced apart linkages that move the support means to assure the movement of each of the back wheels through the same distance. Folding means are provided for permitting the handle and the linkage means to be in a generally upright operating position or in a generally horizontal transporting position.

In a preferred embodiment of the invention, the aerating apparatus comprises a chassis having a rotor with a plurality of aerating tines rotatably mounted thereon and drive means for rotating the rotor so that the aerating apparatus is self-propelled. Support means are rotatably mounted on the chassis for movement between a down location at which the aerating tines are not in contact with the ground and an up location at which the aerating tines are in contact with the ground. The support means have a pair of spaced apart wheels mounted thereon. First and second linkage means are pivotally mounted on opposite side portions of the chassis and are pivotally connected to the support means. A handle is mounted on the chassis for movement between a generally upright operating position and a generally horizontal transporting position. Moving means are pivotally mounted on the handle and are connected to at least one of the first and second linkage means to move the support means to the down or up location. Connecting means extend between the first and second linkage means so that the first and second linkage means move simultaneously through the same distance. Each of the first and second linkage means comprises a first lever arm pivotally mounted on one of the opposite side portions of the chassis, a second lever arm pivotally mounted on the support means and pivot means for pivotally connecting the first and second lever arms. The moving means comprise a lever pivotally mounted on the handle and at least one connecting rod extending between and pivotally connected to the lever and one of the first lever arms so that movement of the lever moves the first lever arm.

Adjusting means are provided for adjusting the position of the back wheels of the support means when the back wheels are in the up location. The adjusting means comprise a member pivotally mounted on the connecting means and having an internally threaded portion. An externally threaded bolt is in threaded engagement with the internally threaded portion and has an enlarged head portion. Stop means are mounted on the chassis for limiting the movement of the externally threaded bolt. Force applying means are provided for applying a force on the support means to move the externally threaded bolt against the stop means so that rotation of the externally threaded bolt moves the connecting means to change the position of the back wheels relative to the chassis. This provides for lateral stability of the aerating apparatus since the back wheels may be adjusted in accordance with the penetration of the tines into the ground. Also, the adjusting means can be utilized to control the depth of the penetration of the tines into the ground.

BRIEF DESCRIPTION OF THE DRAWINGS

An illustrative and presently preferred embodiment of the invention is shown in the accompanying drawings in which:

FIG. 1 is a side elevational view of aerating apparatus of this invention;

FIG. 2 is a rear elevational view of FIG. 1;

DETAILED DESCRIPTION OF THE INVENTION

Figure 3:
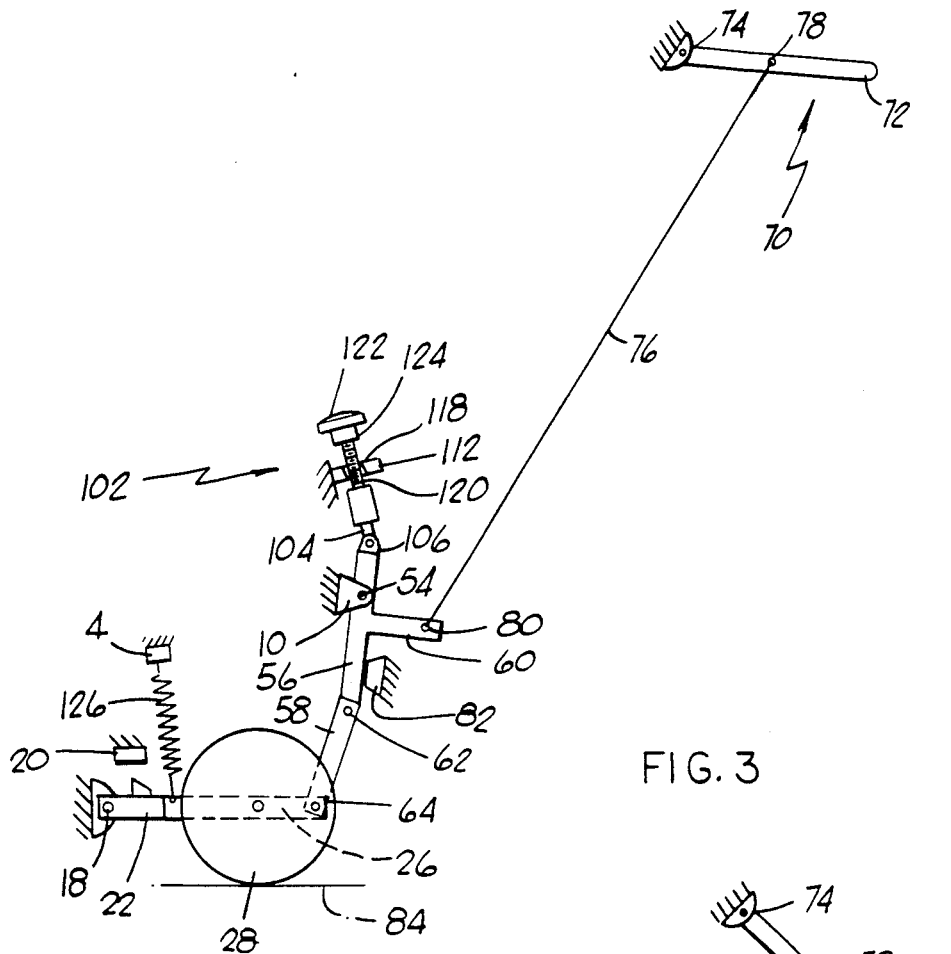
FIG. 3 is a schematic illustration of the apparatus with the rear wheels in the down location.

In FIGS. 1 and 2, there is illustrated aerating apparatus 2 of this invention. The aerating apparatus 2 has a chassis 4 adapted for movement over the ground and has a front portion 6, a back portion 8 and opposite side portions 10. A front wheel 12 is mounted on the chassis 4 for rotation around an axle 14 mounted in a pair of spaced apart brackets 16. An elongated rod 18 is rotatably mounted in brackets 20 secured to the opposite side portions 10. A support bar 22 is secured to each end portion of the elongated rod 18 for movement therewith. Each of the support bars 22 has a bifurcated portion having an outer support section 24 and an inner support section 26. A pair of spaced apart back wheels 28 are rotatably mounted on axles 30 mounted in the outer and inner support sections 24 and 26. A plurality of disks 32 having a plurality of hollow tines 34 extending outwardly therefrom are mounted on a shaft 36 which is rotated by a drive chain 38 driven by the motor 40. A handle 42 is rotatably mounted on the chassis 4 so that it can be moved between a generally upright operating position, solid lines of FIG. 1, to a generally horizontal transporting position, dashed lines of FIG. 1, explained more fully below. A locking cam 44 is used to hold the handle in the generally upright operating position. A pair of spaced apart handles 46 are provided on each side of the chassis 4 for use by at least two persons when loading or unloading the aerating apparatus 2 on or off a truck. Clutch control means 48 are mounted on the handle 42. The chassis 4 is provided with structures so that removable weight 49 may be placed on or removed from the chassis 4.

First and second linkage means 50 and 52 are pivotally mounted on pivot means 54 mounted at fixed locations on the side portions 10. Each of the first and second linkage means 50 and 52 comprise a first lever arm 56 and a second lever arm 58. The first lever arm 56, on the right side of FIG. 2, has a stem portion 60 extending generally perpendicularly therefrom and inclined thereto. The first lever arms 56 are pivotally mounted on the pivot means 54. The first and second lever arms 56 and 58 are pivotally connected by pivot means 62, and the second lever arms 58 are pivotally connected to the inner support sections 26 by pivot means 64. A rod 66 extends between and is secured to the first lever arms 56 at a location adjacent to the free ends 68 to ensure that the force applied to the stem portion 60, as described below, results in uniform movement of each of the first lever arms 56. Moving means 70 are provided for applying a force on the first lever arms 56 to rotate them around the pivot means 54. The moving means 70 comprise a U-shaped lever 72 pivotally mounted on the handle 42 by pivot means 74. An elongated rod 76 is pivotally attached to the U-shaped lever 72 by pivot means 78 and is pivotally attached to the stem portion 60 by pivot means 80. In FIG. 1, the U-shaped lever 72 is in the up position, illustrated by the solid lines, and the wheels 28 are in the down location, illustrated by the solid lines, so that the tines 34 are spaced from the ground and when the U-shaped lever 72 is moved to the down position, illustrated by the dashed lines, the wheels 28 are moved to the up location, illustrated by the dashed lines, so that the tines 34 are in contact with the ground.

When the handle 42 and the elongated rod 76 are in the folded generally horizontal transporting position, dashed lines of FIG. 1, it is not possible to raise the wheels 28 because any force accidentally applied to the lever 72 will not rotate the first lever arm 56.

Figure 4:
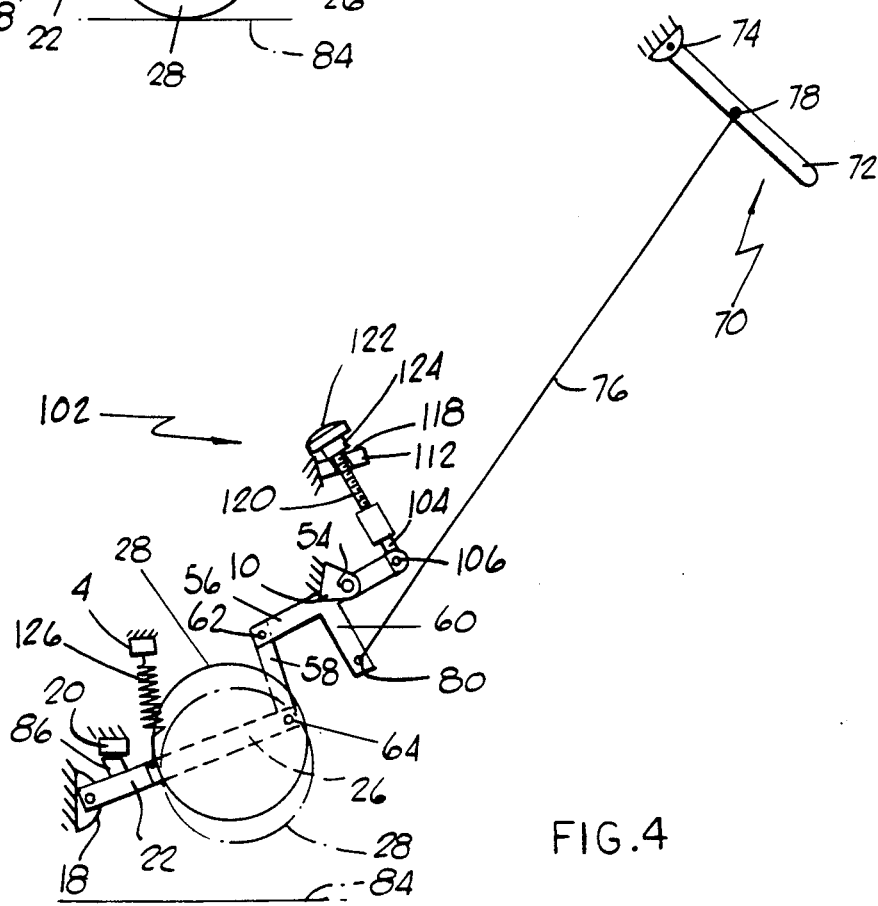
FIG. 4 is a schematic illustration of the apparatus with the rear wheels in the up location.

The operation of the first and second linkage means 50 and 52 is illustrated schematically in FIGS. 3 and 4. In FIG. 3, the U-shaped lever 72 is in the up position. The first lever arms 56 have been rotated around the pivot means 54 until the first lever arms 56 contact a stop member 82 fixedly mounted on the chassis 4. The second lever arms 58 move with the first lever arms 56 so that the back wheels 28 are in contact with the ground 84. In FIG. 4, the U-shaped lever 72 has been moved to the down position. The elongated rod 76 has pivoted the first arms 56 around the pivot means 54 and the second lever arms 58 have been moved diagonally upwardly to the left. The movement of the second lever arms 58 applied a force to the inner support sections 26 to rotate the elongated rod 18 so that the back wheels 28 have been moved to the up location with stop brackets 86 on the support bars 22 in contact with stop member 20 fixedly mounted on the chassis 4.

In FIGS. 1-4, there are illustrated adjusting means 102 for adjusting the wheels 28 when they are in the up location. The adjusting means comprise a member 104 pivotally mounted on the rod 66 by pivot means 106 and projects upwardly therefrom. The member 104 has an internally threaded portion 108. A bracket 110 is secured to the back portion 8 and extends upwardly therefrom and has a flange portion 112 that extends outwardly therefrom at an angle of about 90 degrees. The flange portion 112 is secured to a hollow rod 114 extending between and secured to brackets 116 on the chassis 4. The flange portion 112 has an elongated slot 118, FIGS. 3 and 4, formed therein. An externally threaded bolt 120 passes through the elongated slot 118 and is in threaded connection with the internally threaded portion 108. A hand knob 122 is provided on the externally threaded bolt 120 so that it may be readily rotated. A stop portion 124 is integral with the hand knob 122.

When the wheels 28 are in the down location, illustrated in FIG. 3, the stop portion 124 is spaced from the flange portion 112. When the wheels are in the up location, illustrated in FIG. 4, the stop portion 124 is in contact with the flange portion 112. A spring 126 is connected to the inner support section 26 and the chassis 4 and applies a force on the inner support section 26 to apply a force on the second lever arm 58 and then the first lever arm 56 tending to rotate the first lever arm 56 in a clockwise direction in FIG. 4 to urge the stop portion 124 against the flange portion 112. Rotation of the externally threaded portion 120 applies a force on the rod 66 to rotate the first lever arms 56 in a clockwise or counter-clockwise direction, FIG. 4, to move second lever arms 58 and inner support sections 26 downwardly or upwardly so that the back wheels 28 move between the solid line position in FIG. 4 and the dashed line position in FIG. 4. When the back wheels 28 are in the solid lines position in FIG. 4, further upward movement of the back wheels 28 is prevented by contact between the stop brackets 86 and the stop member 20. This permits the back wheels 28 to be positioned at a desired location relative to the ground 84 when the tines 34 cannot fully penetrate into the ground 84 so as to provide lateral stability of the aerating apparatus 2. Also, the adjusting means may be used to set the back wheels 28 to control the depth of penetration of the tines 34 into the ground.

The apparatus for permitting movement of the handle 42 between the generally upright operating position and the generally horizontal transporting position is illustrated in FIGS. 1 and 2. A rod 130 is rotatably mounted in the hollow rod 114. An end portion of the rod 130 passes through holes in the support brackets 116 and the handle 42. A nut 132 is secured on the rod 130 and is large enough to bear against portions of the handle surrounding the hole in the handle 42. The other end of the rod 130 passes through holes in the support bracket 116 and the handle 42 and has the locking cam 44 rotatably secured thereto. In the locking position, the locking cam 44 moves the rod 130 in an axial direction so that the handles 42 are moved or squeezed into contact with mating surfaces on the support brackets 116. When the locking cam 44 is in the unlocked position, the rod 130 permits rotation of the handle 42 to the generally horizontal transporting position.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. Aerating apparatus comprising:
   a chassis having a front portion, a back portion aerating means for penetrating the ground mounted on the and opposite side portions;
   drive means for rotating said aerating means mounted on said chassis;
   support means rotatably mounted on said chassis for movement between a down location at which said aerating means are out of contact with said ground and an up location at which said aerating means can penetrate said ground;
   said support means including a wheel spaced from each of said opposite side portions;
   first and second linkage means pivotally mounted on said opposite side portions and pivotally connected to said support means, for moving said support means between said down and up locations;
   a handle mounted on said chassis;
   moving means pivotally mounted on said handle and pivotally connected to at least one of said first and second linkage means for moving said first and second linkage means to move said support means between said down and up locations;
   connecting means extending between and secured to said first and second linkage means so that said first and second linkage means will move simultaneously through the same distance;
   said support means comprising:
   an elongated rod pivotally mounted on said chassis;
   a beam secured to each end of said rod and extending perpendicularly therefrom;
   said beam having a portion comprising outer and inner support sections; and
   said wheels mounted on said outer and inner support sections for rotation relative thereto.

2. The invention as in claim 1 wherein each of said first and second linkage means comprise:
   a first lever arm pivotally mounted on one of said opposite side portions;
   a second lever arm pivotally mounted on said support means; and
   pivot means for pivotally connecting said first and second lever arms.

3. The invention as in claim 2 wherein said moving means comprise:
   a lever pivotally mounted on said handle; and
   at least one connecting rod extending between and pivotally connected to said lever and at least one of said first lever arms so that rotation of said lever rotates said at least one of said first lever arms.

4. The invention as in claim 1 wherein said connecting means comprises:
   a rod extending between and secured to said first and second linkage means.

5. The invention as in claim 4 wherein each of said first and second linkage means comprises:
   a first lever arm pivotally mounted on one of said opposite side portions;
   a second lever arm pivotally mounted on said support means;
   pivot means for pivotally connecting said first and second lever arms;
   said first lever arm having a stem portion projecting outwardly therefrom; and
   said moving means being pivotally connected to said stem portion.

6. The invention as in claim 5 wherein said moving means comprise:
   a lever pivotally mounted on said handle; and
   at least one connecting rod extending between and pivotally connected to said lever and at least one of said first lever arms so that rotation of said lever rotates at least one of said first lever arms.

7. The invention as in claim 6 wherein:
   said handle is pivotally mounted on said chassis for movement of said handle and said moving means between a generally upright operating position and a generally horizontal transporting position; and
   locking means for releasably locking said handle and said moving means in said generally upright operating position.

8. The invention as in claim 1 wherein:
   said handle is pivotally mounted on said chassis for movement between a generally upright operating position and a generally horizontal transporting position; and
   locking means for releasably locking said handle in said generally upright operating position.

9. The invention as in claim 1 wherein each of said first and second linkage means comprises:
   a first lever arm pivotally mounted on one of said opposite side portions;
   a second lever arm pivotally mounted on said support means;
   pivot means for pivotally connecting said first and second lever arms;
   said first lever arm having a stem portion projecting outwardly therefrom; and
   said moving means being pivotally connected to said stem portion.

10. The invention as in claim 9 wherein said moving means comprise:
    a lever pivotally mounted on said handle; and
    at least one connecting rod extending between and pivotally connected to said lever and at least one of said first lever arms so that rotation of said lever rotates at least one of said first lever arms.

11. The invention as in claim 1 and further comprising:
    adjusting means for adjusting the position of said support means relative to said chassis.

12. Aerating apparatus comprising:
    a chassis having a front portion, a back portion and opposite side portions;
    aerating means for penetrating the ground mounted on said chassis for rotation relative thereto;
    drive means for rotating said aerating means mounted on said chassis;
    support means rotatably mounted on said chassis for movement between a down location at which said aerating means are out of contact with said ground and an up location at which said aerating means can penetrate said ground;
    said support means including a wheel spaced outwardly from each of said opposite side portions;
    first and second linkage means pivotally mounted on said opposite side portions and pivotally connected to said support means for moving said support means between said down and up locations;
    a handle mounted on said chassis;
    moving means pivotally mounted on said handle and pivotally connected to at least one of said first and second linkage means to move said support means between said down and up locations;
    adjusting means, in addition to said moving means, for adjusting the position of said support means when in said up location to provide lateral stability for said aerating apparatus when said aerating means do not fully penetrate into said ground;

connecting means extending between and secured to said first and second linkage means so that said first and second linkage means will move simultaneously;

said adjusting means comprising:

a member in contact with said connecting means; and force applying means for applying a force to said member to move said connecting means relative to said chassis to rotate said first and second linkage means to move said support means relative to said chassis.

13. The invention as in claim 12 wherein said adjusting means further comprises:

said member being pivotally mounted on said connecting means and having an internally threaded portion;

an externally threaded bolt in threaded engagement with said internally threaded portion;

an enlarged head portion of said threaded bolt;

stop means mounted on said chassis for limiting movement of said threaded bolt; and said force applying means applying a force on said threaded bolt to move said enlarged head portion against said stop means so that rotation of said threaded bolt moves said connecting means.

14. The invention as in claim 12 wherein each of said first and second linkages comprises:

a first lever arm pivotally mounted on one of said opposite side portions;

a second lever arm pivotally mounted on said support means; and pivot means for pivotally connecting said first and second lever arms.

15. The invention as in claim 14 wherein said moving means comprise:

a lever pivotally mounted on said handle; and at least one connecting rod extending between and pivotally connected to said lever and said first lever arm so that rotation of said lever rotates said first lever arm.

16. The invention as in claim 12 wherein said support means comprise:

an elongated rod pivotally mounted on said chassis;

a beam secured to each end of said rod and extending perpendicularly therefrom;

said beam having a bifurcated portion; and said wheels mounted on said bifurcated portions for rotation relative thereto.

17. The invention as in claim 12 wherein:

said handle is pivotally mounted on said chassis for movement between a generally upright operating position and a generally horizontal transporting position; and locking means for releasably locking said handle in said generally upright operating position.

18. Aerating apparatus comprising:

a chassis having a front portion, a back portion and opposite side portions;

aerating means for penetrating the ground mounted on said chassis for rotation relative thereto;

drive means for rotating said aerating means mounted on said chassis;

support means rotatably mounted on said chassis for movement between a down location at which said aerating means are out of contact with said ground and an up location at which said aerating means can penetrate said ground;

said support means including a wheel spaced from each of said opposite side portions;

linkage means pivotally mounted on at least one of said opposite side portions and pivotally connected to said support means, for moving said support means between said down and up locations;

a handle mounted on said chassis;

said handle having two spaced apart members;

moving means pivotally mounted on said handle and pivotally connected to said linkage means for moving said linkage means to move said support means between said down and up locations;

folding means for permitting said handle and said moving means to be moved between a generally upright operating position and a generally horizontal transporting position;

locking means extending between and operatively associated with each of said members for simultaneously applying a force on said members to lock said handle and said moving means in said generally upright operating position; and wherein said locking means comprises:

a hollow rod mounted on said chassis;

a rod mounted in said hollow rod for axial movement relative to said hollow rod;

said rod having opposite end portions;

each of said end portions passing through a hole in each of said spaced apart members;

a pair of support brackets, each of said support brackets having a recess for receiving at least a portion of each of said spaced apart members; and cam means for moving said rod in an axial direction to apply forces on said two spaced apart members to move said two spaced apart members toward each other and to move said portions into said recesses.

19. The invention as in claim 18 and further comprising:

movement limiting means for limiting the movement of said moving means when in said generally horizontal transporting position to prevent the accidental movement of said moving means.

20. The invention as in claim 18 wherein said linkage means comprises:

a first lever arm pivotally mounted on said at least one of said sidewalls;

a second lever arm pivotally mounted on said support means;

pivot means for pivotally connecting said first and second lever means;

said first lever arm having a stem portion projecting outwardly therefrom; and said moving means being pivotally connected to said stem portion.

21. The invention as in claim 20 wherein said moving means comprise:

a lever pivotally mounted on said handle; and at least one connecting rod pivotally mounted on said lever and pivotally connected to said stem portion.

* * * * *

UNITED STATES PATENT AND TRADEMARK OFFICE
CERTIFICATE OF CORRECTION

PATENT NO. : 5,119,880
DATED : June 9, 1992
INVENTOR(S) : Claude D. Zehrung, Jr., et. al.

It is certified that error appears in the above-indentified patent and that said Letters Patent is hereby corrected as shown below:

Claim 1, Column 5, line 2, delete "aerat-" and insert
--and opposite side portions;-- and delete lines 3 and 4 and insert
therefor --aerating means for penetrating the
ground on the chassis for rotation relative
thereto;--.

Signed and Sealed this

Seventh Day of September, 1993

Attest:

BRUCE LEHMAN

*Attesting Officer*  *Commissioner of Patents and Trademarks*